Patented Apr. 11, 1939

2,154,170

UNITED STATES PATENT OFFICE 2,154,170

STABLE BASIC ALUMINUM FORMATE AND SOLUTIONS THEREOF

Leroy A. Kramer, Chicago, Ill., assignor to Victor Chemical Works, a corporation of Illinois No Drawing. Application February 2, 1938, Serial No. 188,391

11 Claims. (Cl. 134—11)

This invention relates to a stable basic aluminum formate and more particularly to clear aqueous solutions thereof.

Basic aluminum formate is recognized as a potentially desirable reagent for the treatment of textile fabrics for the purpose of rendering them water-resistant. The use of this material, however, has not been previously commercially practicable because of the formation of insoluble cloudy precipitates in treating baths containing basic aluminum formate.

On this account the normal aluminum formate or normal aluminum acetate are the generally employed materials. These compounds, however, while more stable than the basic formate, are still subject to a certain amount of decomposition with an attendant precipitation of insoluble materials.

In all these instances, the precipitation of insoluble compounds requires frequent replacement of the baths, as well as interfering with the treatment of the fabrics.

By means of the present invention, a stable basic aluminum formate is produced which will dissolve to form a clear solution in water and will not cloud upon standing even for long periods. Solutions of the material likewise have a relatively high pH value which greatly reduces the tendering of the fibers of the treated fabrics, and also permits the utilization of many dyes on the fabrics which would be damaged by contact with a more acid bath. The basic aluminum formate preferred is the one-third basic aluminum formate (Al(COOH)$_2$OH), which may be prepared in any suitable fashion, for example, by treatment of a normal aluminum formate solution wtih aluminum sulfate and barium carbonate. This solution, which in its untreated form is highly unstable, is then stabilized by the addition of a small percentage of material of the class consisting of adipic, acetic, propionic, butyric and succinic acids. For example, the addition of ½ of 1% adipic acid to a 20% solution of the basic aluminum formate will prevent the solution from becoming turbid even after a week's storage at a temperature of 95° F. Slightly higher amounts of the other acids are desirable, it being preferred to use at least 1% of each of the others for a 20% solution of the formate.

1% of acetic acid when added to a 25% solution of basic formate, however, did not develop any sign of turbidity when kept for six months in a clear glass carboy subject to outdoor weather conditions. The same solution without the acid, however, became very cloudy after a few days.

It is preferred not to employ over about 3% of the stabilizing agent, depending somewhat upon the concentration of the solution of basic aluminum formate. It is preferred that the amount of stabilizer should not be such as to reduce the pH value of the solution below 3.70.

The percentage figures above referred to are based upon the entire solution.

The ratio of stabilizer to formate, on a dry basis, preferably should not exceed 1 to 10.

Preferably, the solutions employed will contain 15 to 30% basic aluminum formate, but higher concentrations may be employed if desired. Likewise, dry basic aluminum formate may be produced, which, on solution, will yield a non-clouding stable solution. For example, a solution of basic aluminum formate prepared by treatment of normal aluminum formate with aluminum sulfate and barium carbonate was stabilized by the addition of 1 to 2% of acetic acid and then concentrated by vacuum evaporation to the desired concentration. The evaporation may be continued under vacuum at 75° C. to yield a solid basic aluminum formate which is soluble in water and will yield a clear stable solution therein.

Solutions produced as above described are substantially odorless and preferably have pH values around 3.8.

The foregoing detailed description has been given for clearness of understanding only, and no unnecessary limitations should be understood therefrom, but the appended claims should be construed as broadly as permissible in view of the prior art.

I claim:

1. As an article of manufacture one-third basic aluminum formate including sufficient stabilizing material of the class consisting of adipic, acetic, propionic, butyric and succinic acids to produce a clear stable solution in water.

2. An article as set forth in claim 1 in which the stabilizing acid is present in an amount from 2½ to 10% of the formate.

3. An article as set forth in claim 1 in which the stabilizing material is adipic acid.

4. An article as set forth in claim 1 in which the stabilizing material is acetic acid.

5. An aqueous stable solution of one-third basic aluminum formate containing a small proportion of stabilizing material of the class consisting of adipic, acetic, propionic, butyric and succinic acids.

6. A solution as set forth in claim 5 in which the formate solution is from 15 to 30% concentration and the stabilizing agent is present in an amount from 0.5 to 3% based on the weight of the solution.

7. A solution as set forth in claim 5 in which the stabilizing material is acetic acid.

8. A solution as set forth in claim 5 in which the stabilizing material is adipic acid.

9. A stable solution as set forth in claim 5 in which the pH of the solution is not lower than 3.7.

10. An aqueous solution of one-third basic aluminum formate from 15 to 30% concentration and stabilized against hydrolysis by the addition of a minor proportion of acetic acid, said solution having a pH value not lower than 3.7.

11. A stable non-clouding substantially odorless solution including one-third basic aluminum formate and a minor proportion of acetic acid.

LEROY A. KRAMER.